(12) United States Patent
Guerrero et al.

(10) Patent No.: US 11,522,843 B2
(45) Date of Patent: Dec. 6, 2022

(54) METHOD AND DEVICES FOR COMMUNICATING BETWEEN AN INTERNET OF THINGS DEVICE AND A REMOTE COMPUTER SYSTEM

(71) Applicant: LEGIC Identsystems AG, Wetzikon (CH)

(72) Inventors: Sebastian Guerrero, Zürich (CH); Rolf Lanz, Baden-Rütihof (CH); Marcel Plüss, Tann (CH); Paul Studerus, Oberweningen (CH)

(73) Assignee: LEGIC Identsystems AG, Wetzikon (CH)

( * ) Notice: Subject to any disclaimer, the term of this patent is extended or adjusted under 35 U.S.C. 154(b) by 258 days.

(21) Appl. No.: 16/595,725

(22) Filed: Oct. 8, 2019

(65) Prior Publication Data

US 2020/0112549 A1     Apr. 9, 2020

(30) Foreign Application Priority Data

Oct. 9, 2018    (CH) .................................. 01235/18

(51) Int. Cl.
| | |
|---|---|
| *H04L 9/40* | (2022.01) |
| *G06F 8/61* | (2018.01) |
| *G06F 9/445* | (2018.01) |
| *H04B 1/3827* | (2015.01) |
| *H04L 9/08* | (2006.01) |

(Continued)

(52) U.S. Cl.
CPC ............ *H04L 63/0492* (2013.01); *G06F 8/61* (2013.01); *G06F 9/445* (2013.01); *H04B 1/3827* (2013.01); *H04L 9/0891* (2013.01); *H04L 9/3226* (2013.01); *H04L 63/126* (2013.01); *H04L 67/12* (2013.01); *H04W 12/03* (2021.01)

(58) Field of Classification Search
CPC ....... H04L 67/12; H04L 67/34; H04L 67/104; H04L 63/0281; H04L 63/18; H04L 12/4633; H04L 9/321; H04W 4/70; H04W 4/80; H04W 88/04
See application file for complete search history.

(56) References Cited

U.S. PATENT DOCUMENTS

| 10,044,674 | B2 * | 8/2018 | Liu ........................ H04L 67/10 |
| 10,581,872 | B1 * | 3/2020 | Berg ..................... H04L 9/3236 |

(Continued)

OTHER PUBLICATIONS

Mar. 26, 2019—(CH) Search Report—App 01235/18.

*Primary Examiner* — Tae K Kim
(74) *Attorney, Agent, or Firm* — Banner & Witcoff, Ltd.

(57) ABSTRACT

For communicating between an Internet of Things (IoT) device and a remote computer system, the IoT device transmits an upload data message via a close range communication circuit to a mobile communication device, for forwarding to the remote computer system. The remote computer system receives the upload data message via a mobile radio communication network and stores an address of the mobile communication device, as a communication relay address for the IoT device. The remote computer system transmits a download data message via the mobile radio communication network to the communication relay address, for forwarding to the IoT device. The IoT device receives the download data message from the remote computer system, as forwarded by the mobile communication device via the close range communication circuit.

14 Claims, 3 Drawing Sheets

(51) Int. Cl.
   *H04L 9/32*      (2006.01)
   *H04L 67/12*     (2022.01)
   *H04W 12/03*     (2021.01)

(56) References Cited

U.S. PATENT DOCUMENTS

| | | | |
|---|---|---|---|
| 2015/0201022 A1* | 7/2015 | Kim | G06F 9/5061 |
| | | | 709/203 |
| 2015/0365217 A1* | 12/2015 | Scholten | H04W 88/04 |
| | | | 370/315 |
| 2016/0364223 A1* | 12/2016 | Vandikas | H04L 67/34 |
| 2017/0041316 A1* | 2/2017 | Setchell | H04L 63/0876 |
| 2017/0169264 A1* | 6/2017 | Britt | H04L 9/3247 |
| 2018/0007140 A1* | 1/2018 | Brickell | H04W 12/00 |
| 2018/0020442 A1* | 1/2018 | Nair | H04B 7/15528 |
| 2018/0097690 A1* | 4/2018 | Yocam | H04W 4/70 |
| 2018/0102916 A1* | 4/2018 | Chen | H04L 67/63 |
| 2018/0109308 A1* | 4/2018 | Leroux | H04B 7/2606 |
| 2018/0213370 A1* | 7/2018 | Plüss | G07C 9/00309 |
| 2019/0037361 A1* | 1/2019 | Nakamura | H04W 4/029 |
| 2019/0253243 A1* | 8/2019 | Zimmerman | H04W 4/70 |
| 2019/0281455 A1* | 9/2019 | Luo | H04W 12/06 |

\* cited by examiner

METHOD AND DEVICES FOR COMMUNICATING BETWEEN AN INTERNET OF THINGS DEVICE AND A REMOTE COMPUTER SYSTEM

CROSS REFERENCE TO RELATED APPLICATIONS

This application claims priority to Switzerland Application No. 01235/18, filed Oct. 9, 2018, herein incorporated by reference.

FIELD OF THE TECHNOLOGY

The present disclosure relates to a method and devices for communicating between an Internet of Things device and a remote computer system. Specifically, the present disclosure relates to a method, a computer system, and an Internet of Things device for communicating between the Internet of Things device and the computer system arranged remotely from the Internet of Things device.

BACKGROUND OF THE TECHNOLOGY

The so called Internet of Things or "IoT" is a network of physical devices, machines, vehicles, home appliances, and other items embedded with electronics, software, sensors, actuators, and electronic communication circuits, which enable these things or devices to connect and exchange data. The IoT extends the Internet beyond traditional (standard) computing devices, such as desktops, laptops, smartphones, tablets and smart watches, to any range of traditionally non-computational and/or non-Internet-enabled physical devices and objects. The IoT is proliferating to the home, the office, and the streets and beyond. In general, IoT devices are configured to connect wirelessly to a network and transmit data. Typically, an IoT device comprises an electronic communication circuit for close range communication, such as RFID (Radio Frequency Identification), Bluetooth, Bluetooth Low Energy (BLE), and the like, which enable data communication up to a few meters, e.g. up to one to five meters, up to ten meters, or even up to hundred meters. However, a large number of IoT devices, if not the majority or typical IoT device, is not configured for wireless communication over an extended range directly and independently through a mobile radio network (cellular network), such as GSM (Global System for Mobile Communication) or UMTS (Universal Mobile Telephone System). Unless these IoT devices, which are limited to close range wireless communication, are installed or arranged within connectivity proximity of an access point to the Internet, it is very difficult and/or inefficient to provide these IoT devices with data updates, for example update of firmware, access rights, etc.

SUMMARY OF THE DISCLOSURE

The disclosure provides a method, an IoT device, and a computer system for communicating between the IoT device and the computer system, whereby the computer system is arranged remotely from the IoT device and there is no wireless connectivity between the IoT device and the computer system.

According to the present disclosure, this is addressed through the features of the independent claims. In addition, further advantageous embodiments follow from the dependent claims and the description.

According to the present disclosure, for communicating between an Internet of Things device and a remote computer system, an upload data message for the remote computer system is transmitted from the Internet of Things device via a close range communication circuit to a mobile communication device within the close range of the Internet of Things device, for forwarding to the remote computer system via a mobile radio communication network. The upload data message includes a unique identifier of the Internet of Things device. The upload data message from the Internet of Things device is received in the remote computer system, as forwarded by the mobile communication device via the mobile radio communication network. In the remote computer system an address of the mobile communication device is stored, as a communication relay address, linked to the unique identifier of the Internet of Things device. A download data message for the Internet of Things device is transmitted from the remote computer system via the mobile radio communication network to the communication relay address linked to the unique identifier of the Internet of Things device, for forwarding to the Internet of Things device. The download data message from the remote computer system is received in the Internet of Things device, as forwarded by the mobile communication device via the close range communication circuit.

In an embodiment, a verification message is generated in the Internet of Things device, by encrypting the unique identifier, stored securely in the Internet of Things device, using a cryptographic key stored securely in the Internet of Things device. The verification message is included in the upload data message. The unique identifier is verified by the remote computer system decrypting the verification message included in the upload data message, using a cryptographic key stored securely in the remote computer system.

In an embodiment, a secured data package is received in the Internet of Things device from the mobile communication device via the close range communication circuit. The secured data package is decrypted in the Internet of Things device, using a cryptographic key stored securely in the Internet of Things device. A replacement cryptographic key is extracted in the Internet of Things device from the decrypted secured data package, and the cryptographic key stored securely in the Internet of Things device is replaced with the replacement cryptographic key.

In an embodiment, an identifier of a back-end system, associated with the remote computer system, is extracted in the Internet of Things device from the secured data package. The identifier of the back-end system is stored in the Internet of Things device for inclusion in the upload data message for the remote computer system.

In an embodiment, customization information, included by the mobile communication device, is received in the remote computer system with the upload data message from the Internet of Things device. The customization information is stored in the remote computer system linked to the unique identifier of the Internet of Things device. The customization information is transmitted with the download data message, from the remote computer system, to the communication relay address linked to the unique identifier of the Internet of Things device, for forwarding to the Internet of Things device. The customization information, received with the download data message from the remote computer system, as forwarded by the mobile communication device, is stored in the Internet of Things device.

In an embodiment, the remote computer system includes a version indicator in the download data message. In the Internet of Things device, the download data message from the remote computer system, as forwarded by the mobile communication device, is discarded, if the version indicator included in the download data message is outdated when compared to version indicators stored in the Internet of Things device, from previously received download data message from the remote computer system, as forwarded previously by the mobile communication device.

In an embodiment, the remote computer system includes in the download data message executable code for the Internet of Things device and encrypts the download data message, using an encryption key. The Internet of Things device decrypts the download data message from the remote computer system, as forwarded by the mobile communication device, using a cryptographic key stored securely in the Internet of Things device, extracts the executable code from the download data message, and installs and executes the executable code in the Internet of Things device.

In an embodiment, the remote computer system forwards in the download data message an instruction from a back-end system for the Internet of Things device to the communication relay address linked to the unique identifier of the Internet of Things device. The Internet of Things device extracts the instruction from the download data message, as forwarded by the mobile communication device, and executes the instruction in the Internet of Things device. The instruction comprising a reset instruction, a firmware update instruction, and/or an access rights update instruction. The firmware update instructions may include executable code, as outlined above. The access rights update instruction includes access rights and/or access right time data.

In addition to the method of communicating between an Internet of Things device and a remote computer system, the present disclosure also relates to a computer system for communicating with an Internet of Things device. The computer system for communicating with an Internet of Things device comprises a communication module configured to exchange data with a mobile communication device via a mobile radio communication network. The computer system further comprises a processor configured to extract from an upload data message from the Internet of Things device, as received by the mobile communication device from the Internet of Things device via a close range communication circuit and forwarded by the mobile communication device via the mobile radio communication network to the computer system, a unique identifier of the Internet of Things device. The processor is configured to store in the remote computer system an address of the mobile communication device, as a communication relay address, linked to the unique identifier of the Internet of Things device, and to transmit via the mobile radio communication network a download data message for the Internet of Things device to the communication relay address linked to the unique identifier of the Internet of Things device, for forwarding by the mobile communication device via the close range communication circuit to the Internet of Things device.

In an embodiment, the processor is further configured to extract from the upload data message a verification message, generated in the Internet of Things device by encrypting the unique identifier using a cryptographic key, and to verify the unique identifier by decrypting the verification message included in the upload data message, using a cryptographic key stored securely in the remote computer system.

In an embodiment, the processor is further configured to receive, with the upload data message from the Internet of Things device, customization information included by the mobile communication device; to store the customization information in the remote computer system linked to the unique identifier of the Internet of Things device; and to transmit the customization information with the download data message to the communication relay address linked to the unique identifier of the Internet of Things device, for forwarding to the Internet of Things device.

In an embodiment, the processor is further configured to extract from the upload data message an identifier of a back-end system, included in the Internet of Things device; and to forward at least a part of the upload data message to a computer system defined by the identifier of the back-end system, the part including the unique identifier of the Internet of Things device.

In an embodiment, the processor is further configured to receive from a back-end system an instruction for the Internet of Things device; and to forward the instruction from the back-end system in the download data message to the communication relay address linked to the unique identifier of the Internet of Things device, for forwarding to the Internet of Things device, the instruction comprising a reset instruction, a firmware update instruction, and/or an access rights update instruction.

In addition to the method of communicating between an Internet of Things device and a remote computer system, and the computer system for communicating with the Internet of Things device, the present disclosure also relates to an Internet of Things device. The Internet of Things device comprises an electronic communication circuit for close range communication, and a processor connected to the electronic communication circuit. The Internet of Things device further comprises a data store which has stored therein securely a unique identifier of the Internet of Things device. The processor is configured to transmit via the electronic communication circuit to a mobile communication device, within the close range of the Internet of Things device, an upload data message for a remote computer system, for forwarding by the mobile communication device via a mobile radio communication network to the remote computer system, and to receive via the close range communication circuit a download data message from the remote computer system, as received by the mobile communication device from the remote computer system via a mobile radio communication network and forwarded by the mobile communication device via the close range communication circuit to the Internet of Things device.

In an embodiment, the processor is further configured to generate in the Internet of Things device a verification message by encrypting the unique identifier, using a cryptographic key stored securely in the Internet of Things device, and including the verification message in the upload data message, for verification of the unique identifier by the remote computer system.

In an embodiment, the processor is further configured to receive in the Internet of Things device a secured data package from the mobile communication device via the electronic communication circuit; to decrypt in the Internet of Things device the secured data package, using the cryptographic key stored securely in the Internet of Things device; to extract in the Internet of Things device a replacement cryptographic key from the secured data package decrypted; and to replace the cryptographic key stored securely in the Internet of Things device with the replacement cryptographic key.

In an embodiment, the processor is further configured to extract from the secured data package an identifier of a back-end system associated with the remote computer system; and to store the identifier of the back-end system in the Internet of Things device, for inclusion in upload data message for the remote computer system.

In an embodiment, the processor is further configured to extract from the download data message customization information included by the remote computer system; and to store in the Internet of Things device the customization information received with the download data message from the remote computer system, as forwarded by the mobile communication device.

In an embodiment, the processor is further configured to extract from the download data message a version indicator, included by the remote computer system; and to discard in the Internet of Things device the download data message from the remote computer system, as forwarded by the mobile communication device, if the version indicator included in the download data message is outdated when compared to version indicators stored in the Internet of Things device, from previously received download data message from the remote computer system, as forwarded previously by the mobile communication device.

In an embodiment, the processor is further configured to decrypt the download data message from the remote computer system, as forwarded by the mobile communication device, using a cryptographic key stored securely in the Internet of Things device, to extract from the download data message executable code, included by the remote computer system, and to install and execute the executable code in the Internet of Things device.

In an embodiment, the processor is further configured to extract from the download data message, as forwarded by the mobile communication device, an instruction from a back-end system for the Internet of Things device, included by the remote computer system, and to execute the instruction in the Internet of Things device, the instruction comprising a reset instruction, a firmware update instruction, and/or an access rights update instruction.

BRIEF DESCRIPTION OF THE DRAWINGS

The present disclosure will be explained in more detail, by way of example, with reference to the drawings in which.

DETAILED DESCRIPTION OF THE PREFERRED EMBODIMENTS

Figure 1:
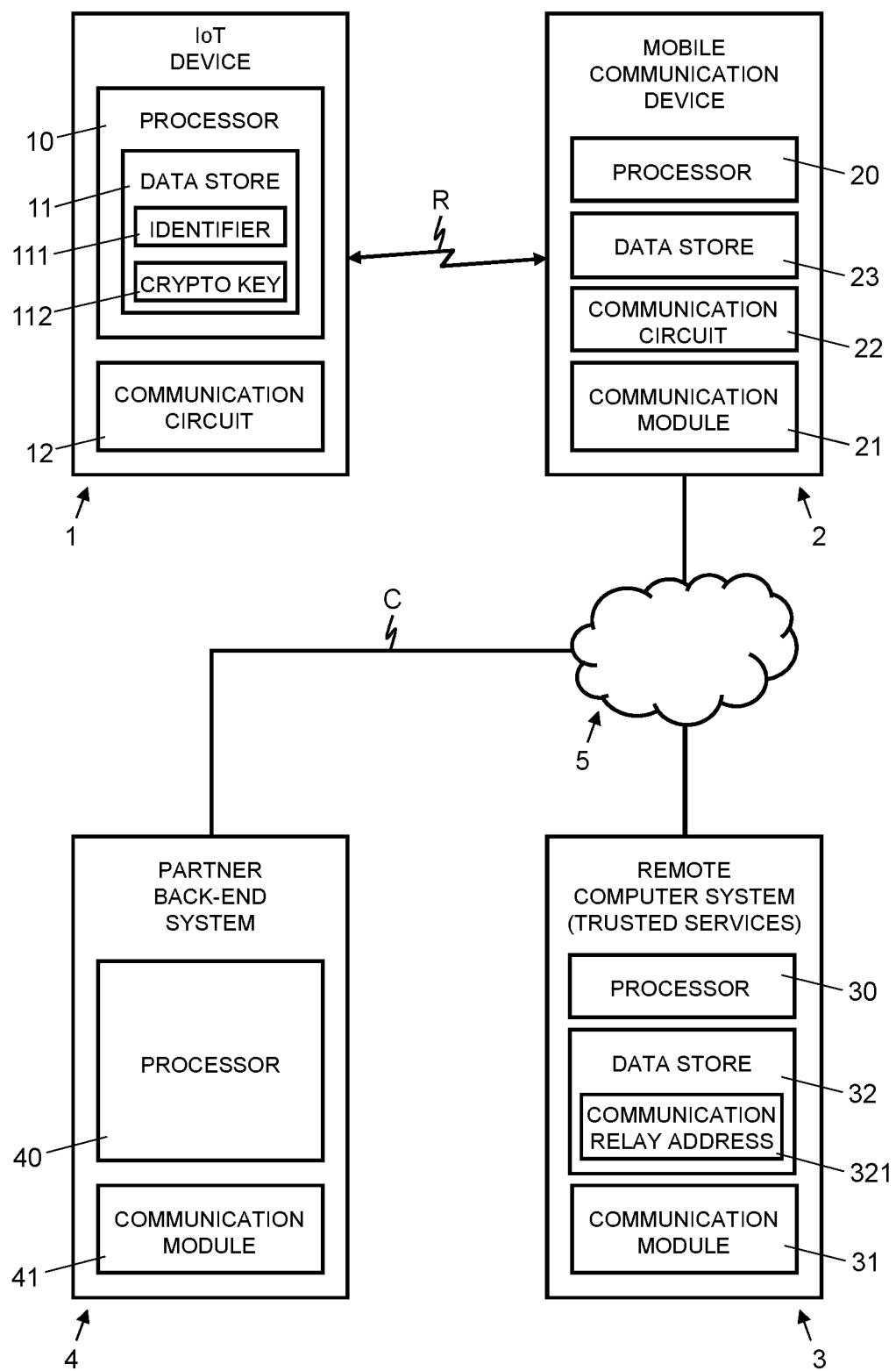
FIG. 1 shows a block diagram illustrating schematically an Internet of Things device communicating via a mobile communication device with a remote computer system which is associated with a partner back-end system.
Figure 2:
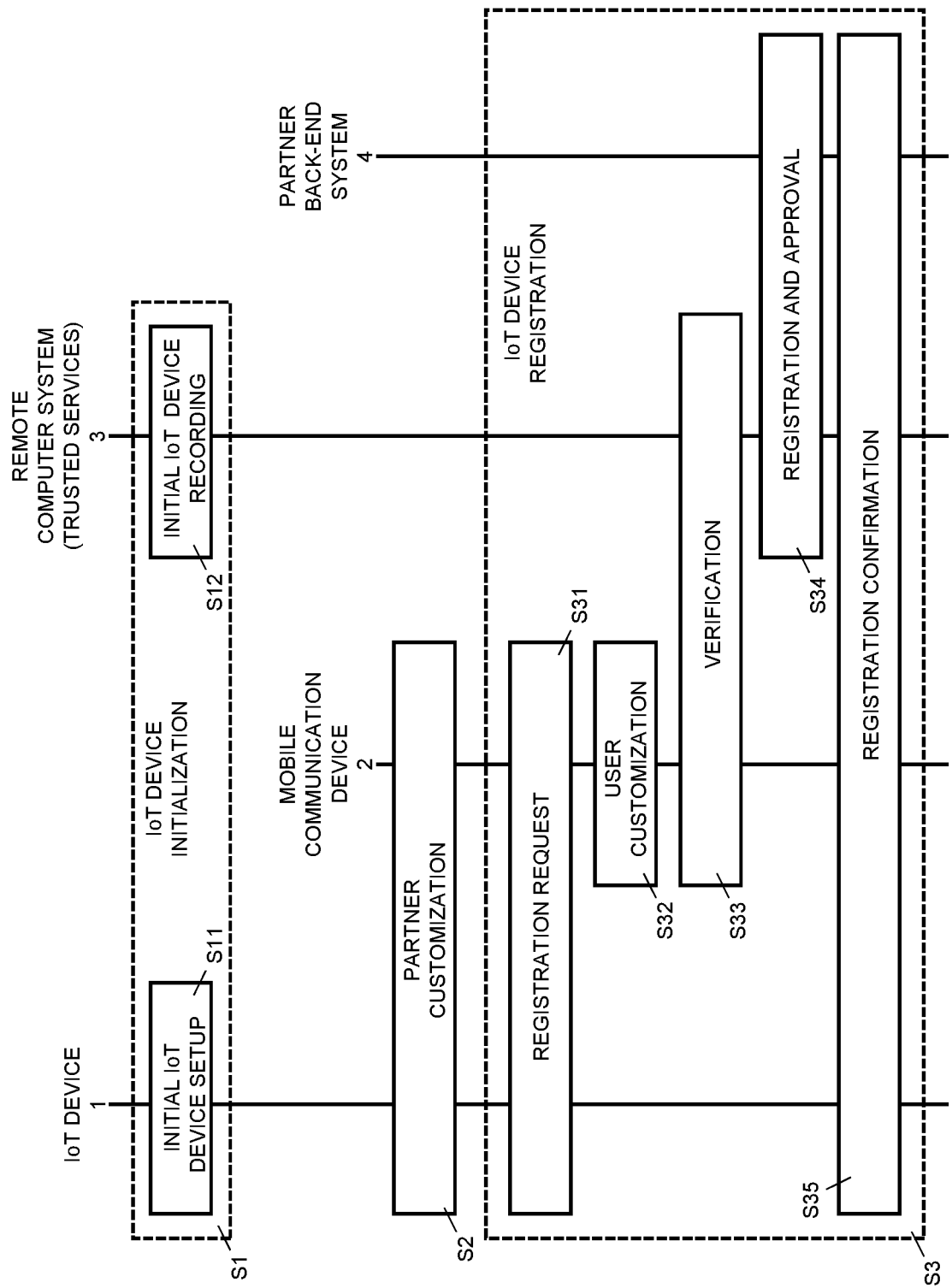
FIG. 2 shows a timing diagram illustrating an exemplary sequence of steps for registering an Internet of Things device via a mobile communication device with a remote computer system and a partner back-end system associated with the remote computer system.
Figure 3:
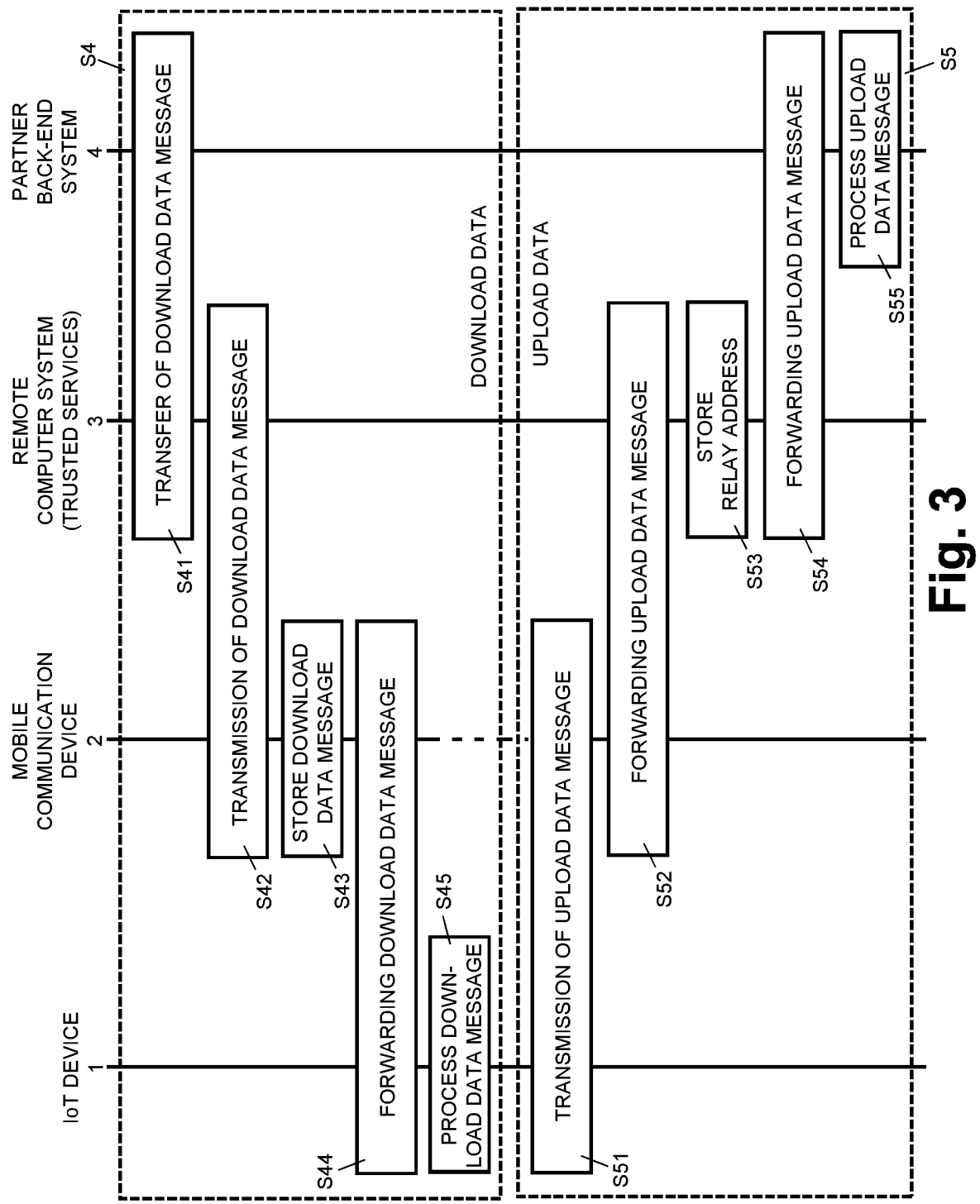
FIG. 3 shows a timing diagram illustrating an exemplary sequence of steps for exchanging data between an Internet of Things device, via a mobile communication device, and a partner back-end system associated with a remote computer system.

In FIGS. 1-3, reference numeral 1 refers to an Internet of Things (IoT) device. As illustrated schematically in FIG. 1, the IoT device 1 comprises a processor 10 and an electronic communication circuit 12 connected to the processor 10. The IoT device 1 further comprises a data store 11, e.g. memory, having stored therein securely a unique identifier 111 of the IoT device 1 and a cryptographic key 112. In an embodiment, the processor 10 and/or the data store 11 are implemented as a hardware secure element. The IoT device 1 is a mobile, portable device, implemented as a self-contained unit arranged in a housing, e.g. a dongle, a key fob, a tag, or the like, or a device arranged in another mobile or stationary physical device, e.g. a machine, a vehicle, a home appliance, and other items embedded with electronics, software, sensors, and/or actuators. The IoT device 1 is powered by a battery included in the IoT device 1, by a power supply of the physical device having integrated the IoT device 1 therein, or by the mobile communication device 2 through induction.

The electronic communication circuit 12 is configured for close range communication R with a stationary or mobile communication device 2, within the close range of the Internet of Things device 1. The electronic communication circuit 12 comprises an RFID (Radio Frequency Identification), Bluetooth, or BLE (Bluetooth Low Energy) circuit, or another circuit for wireless data communication over a close range, such as up to a few meters, e.g. up to one to five meters, up to ten meters, or even up to a hundred meters.

The mobile communication device 2 is implemented as a mobile radio telephone (cellular phone), a laptop computer, a tablet computer, a smart watch, or another mobile electronic device configured for wireless communication via close range R and via a communication network 5, specifically via a mobile radio network. For that purpose, the mobile communication device 2 comprises a communication circuit 22 for close range communication, compatible to the communication circuit 12 of the IoT device 1, and a communication module 21 for communicating via a mobile radio network, as illustrated in FIG. 1. The communication network 5 comprises a mobile radio network such as a GSM (Global System for Mobile Communication) network, a UMTS (Universal Mobile Telephone System) network, and/or another cellular radio communication network. As illustrated in FIG. 1, the mobile communication device 2 further comprises a processor 20 and a data store 23 having stored therein program code, configured to control the processor 20, and a secured data package, as described later in more detail. The communication network 5 further comprises the Internet and LAN (local Area Network) and WLAN (Wireless LAN) for accessing the Internet.

In FIGS. 1-3, reference numeral 3 refers to a computer system, which is arranged remotely from the IoT device 1 and the mobile communication device 2. The remote computer system 3 comprises one or more computers with one or more processors 30 and a communication module 31 configured to communicate via the communication network 5 with the mobile communication device 2 and a partner back-end system 4 associated with the remote computer system 3. The remote computer system 3 is configured as a trusted service provider for the partner back-end system 4 and associated IoT devices 1. The remote computer system 3 further comprises a data store 32 for storing IoT device data and "communication relay addresses" 321 assigned to IoT devices 1.

The partner back-end system 4 comprises one or more computers with one or more processors 40 and a communication module 41 configured to communicate via the communication network 5 with the remote computer system 3 associated with the back-end system 4. In an embodiment, the computer system 3 and the partner back-end system 4 are configured in one common computer centre, e.g. as a cloud-based computing centre.

In the following paragraphs, described with reference to FIGS. 2 and 3 are possible sequences of steps performed by the IoT device 1, the mobile communication device 2, the computer system 3, and the partner back-end system 4, or their processors 10, 20, 30, 40, respectively, for exchanging data securely via the communication network 5 between the IoT device 1, the mobile communication device 2, the remote computer system 3, and/or the partner back-end system 4, respectively, for communicating between the IoT device 1 and the remote computer system 3 and/or the associated partner back-end system 4.

FIG. 2 illustrates an exemplary sequence of steps for an initial setup of the IoT device 1 and for registering the IoT device 1 via the mobile communication device 2 with the remote computer system 3 and the partner back-end system 4 associated with the remote computer system 3.

In step S1, the IoT device 1 is initialized. Specifically, in step S11, an initial setup of the IoT device 1 is performed. Performing the initial setup includes storing securely in the data store 11 of the IoT device 1 a unique identifier 111 of the IoT device 1 and a cryptographic key 112 for the IoT device 1. In step S12, the unique identifier 111 of the IoT device 1 and the cryptographic key 112 of the IoT device 1 are recorded (stored) in the remote computer system 3. For example, the unique identifier 111 of the IoT device 1 and the cryptographic key 112 of the IoT device 1 are generated and stored in the data store 11 of the IoT device 1 in a secured environment, e.g. in facilities with secured access and strict access control, and the unique identifier 111 and the cryptographic key 112 of the IoT device 1 are stored in the data store 32 of the remote computer system 3 either through a secured communication line or in situ inside the secured environment.

In step S2, the IoT device 1 is customized for the partner back-end system 4. Specifically, via the close range communication interface, established by the close range communication circuits 12, 22 of the IoT device 1 and the mobile communication device 2, the IoT device 1 is customized by transferring partner customization data from the mobile communication device 2 to the IoT device 1, e.g. by a partner customization app installed and executing on the processor 20 of the mobile communication device 2. The partner customization data is transferred in a secured data container. The secured data container comprises the partner customization data in encrypted form and is part of the partner customization app, as provided by the partner back-end system 4 or a dedicated app server, for example. The processor 10 of the IoT device 1 receives and decrypts the secured data package from the mobile communication device 2, using the cryptographic key 112 stored in the IoT device 1. The processor 10 of the IoT device 1 extracts from the decrypted data package the partner customization data. In an embodiment, the partner customization data includes a replacement cryptographic key and/or an identifier of the partner back-end system 4. The processor 10 of the IoT device 1 replaces the cryptographic key 112 stored securely in the IoT device 1 with the replacement cryptographic key extracted from the secured data package. The processor 10 of the IoT device 1 further stores in the IoT device 1 the identifier of the partner back-end system 4 extracted from the secured data package.

In FIG. 2, the steps of block S3 relate to a registration process for registering the IoT device 1 with the remote computer system 3 and the associated partner back-end system 4.

In step S31, processor 10 of the IoT device 1 generates a registration request. Depending on the configuration and/or application scenario, generation of the registration request is initiated in response to a command from the mobile communication device 2, as generated by the partner customization app, or to actuation by a user of an operating element of the IoT device 1, e.g. a switch or button which is connected to the processor 10 of the IoT device 1. The processor 10 of the IoT device 1 includes in the registration request the identifier of the partner back-end system 4 and a verification message. The verification message is generated by the processor 10 of the IoT device 1 encrypting the unique device identifier 111 using the cryptographic key 112 or its replacement key, respectively. The processor 10 of the IoT device 1 transmits the registration request in an upload data message via the electronic communication circuit 12 to the mobile communication device 2.

In step S32, the mobile communication device 2 or its processor 20 controlled by the partner customization app, respectively, receives from the user (user) customization information, such as a user name and access control information, e.g. a user password and/or a partner access code.

In step S33, the IoT device 1 and its user are verified by the remote computer system 3. The mobile communication device 2 or its processor 20 controlled by the partner customization app, respectively, forwards the upload data message, received from the IoT device 1, and the user customization information via the communication network 5, specifically via the mobile radio network, to the remote computer system 3. The remote computer system 3 or its processor 30, respectively, extracts the verification message from the registration request and verifies the device identifier of the IoT device 1 by decrypting the verification message, using the cryptographic key 112, initially stored in the IoT device 1, or its replacement key, provided securely by the partner back-end system 4. The device identifier received in the uploaded verification message is verified by comparing it to the unique identifiers initially recorded for the IoT device 1 in the remote computer system 3. Upon positive verification, the registration process is continued.

In step S34, the remote computer system 3 or its processor 30, respectively, stores, assigned to the verified device identifier of the IoT device 1, the received identifier of the partner back-end system, the (user) customization information, including the user name, and the address of the mobile communication device 2 which forwarded the upload data message to the remote computer system 3, e.g. a Mobile Subscriber Integrated Services Digital Network Number (MSISDN). The address of the mobile communication device 2 is stored as a current "communication relay address" 321 for forwarding download data messages to the IoT device 1. The status of the IoT device 1 is set to "registration pending, awaiting approval from partner back-end system". Furthermore, the remote computer system 3 or its processor 30, respectively, transmits to the partner back-end system 4 (as defined by the received identifier of the partner back-end system) a registration message which includes the verified unique identifier of the IoT device 1, and the user customization information, including the user name and access control information, e.g. a user password and/or a partner access code. The partner back-end system 4 verifies the access control information and, upon positive verification, approves and registers the IoT device 1 by storing the unique device identifier assigned to the user name.

In step S35, registration of the IoT device 1 is completed by the partner back-end system 4 transmitting a registration confirmation message to the remote computer system 3. At the remote computer system 3, the status of the IoT device 1 is set to "registration pending, awaiting acknowledgement from IoT device", and the remote computer system 3 transmits a download data message with a confirmation to the address of the mobile communication device 2 stored as the current "communication relay address" 321 for the IoT device 1, for forwarding to the IoT device 1. If the "communication relay address" 321 changes before the status of the IoT device is set to "registered", because the IoT device 1 contacts the remote computer system 3 via another mobile communication device 2, the remote computer system 3 retransmits the download data message with the confirmation to the "new" address of the mobile communication device 2. Once the mobile communication device 2 and the IoT device 1 are within communication range, the mobile communication device 2 transmits the download message with the confirmation via the communication circuit 22 to the IoT device 1. In an embodiment, the download data message with the confirmation includes user and/or partner customization information, e.g. the user name, included by the remote computer system 3 and/or the partner back-end system 4, which is stored in the IoT device 1 by the processor 10 of the IoT device 1. The processor 10 of the IoT device 1 transmits an upload data message with an acknowledgement via the communication circuit 12 to the mobile communication device 2 for forwarding to the remote computer system 3. The mobile communication device 2 transmits the upload data message with the acknowledgement to the remote computer system 3. The remote computer system 3 sets the status of the IoT device 1 to "registered".

FIG. 3 illustrates exemplary sequences of steps for transmitting a download data message from the partner back-end system 4 associated with the remote computer system 3 via the mobile communication device 2 to the IoT device 1, as shown in block S4, and for transmitting an upload data message from the IoT device 1 via the mobile communication device 2 to the partner back-end system 4 associated with the remote computer system 3, as shown in block S5.

Transmitting a download data message from the partner back-end system 4 and/or the remote computer system 3 via the mobile communication device 2 to the IoT device 1, makes it possible to transfer to the IoT device 1 executable code, e.g. for a firmware update of the IoT device 1, and instructions to be executed by the IoT device 1, e.g. a reset instruction, a firmware update instruction, or an access rights update instruction.

The download data messages are end-to-end encrypted between either the partner back-end system 4 or the remote computer system 3 and the IoT device 1. Correspondingly, the upload data messages are end-to-end encrypted between the IoT device 1 and either the remote computer system 3 or the partner back-end system 4. The mobile communication device 2 is merely used to relay the secured data messages between the IoT device 1 and the remote computer system 3.

A user may use different mobile communication devices 2 as an intermediary communication relay device, which will be recorded in the remote computer system 3 with its address as the current "communication relay address" 321, whenever upload data messages from the IoT device 1 are received at the remote computer system 3. Download data messages which have not yet been confirmed by the IoT device 1 will be retransmitted by the remote computer system 3 whenever there is a change in the mobile communication devices 2 or the "communication relay address" 321, respectively. To avoid that the IoT device 1 processes outdated download data messages received from a mobile communication device 2, a version indicator is included in the download data message by the remote computer system 3 (or the partner back-end system 4), enabling the IoT device 1 to detect outdated download data message, by comparing version indicator of a newly received download data message to the stored version indicator of a previously received download data message. The version indicator includes a sequential number and/or date and time information (time stamp).

In step S41, the partner back-end system 4 or its processor 40, respectively, generates and transmits to the remote computer system 3 a download data message for transmission to the IoT device 1, identified by its unique identifier 111. The remote computer system 3 includes a version indicator in the download data message, encrypts the download data message with the cryptographic key 112 or replacement key stored in the IoT device 1, and stores the download data message assigned to the IoT device 1 for possible retransmissions at a later point in time.

In step S42, the remote computer system 3 transmits the encrypted data message via the communication network 5 to the current "communication relay address" 321 assigned to the IoT device 1 for forwarding to the IoT device 1 by the respective mobile communication device 2.

In step S43, the mobile communication device 2 receives and stores the download data message for forwarding to the IoT device 1 (once it is within communication range).

In step S44, when the mobile communication device 2 is within the communication range of the IoT device 1 (or vice versa), the mobile communication device 2 transmits the download data message via the communication circuit 22 to the IoT device 1.

In step S45, the processor 10 of the IoT device 1 processes the received download data message. The processor 10 decrypts the download data message, using the cryptographic key 112 stored in the IoT device 1, and checks whether the version indicator of the received download data message indicates a newer version of download data message than previously received and stored in the IoT device 1. If the download data message is outdated, it is ignored and optionally an error message is transmitted to the mobile communication device 2. Otherwise, if the download data message is newer than previously received messages, the processor 10 continues processing the download data message and stores the version indicator of the received download data message. Depending on its contents, the processor 10 executes instructions, such as executing a firmware update by installing and executing received executable code, executing a reset of the IoT device 1, replacing an encryption key, and/or performing an update of access rights with received access rights and/or access rights time information. For confirming receipt and processing of the download data message, the IoT device 1 transmits an upload data message with a confirmation (acknowledgement) message to the partner back-end system 4.

In step S51, the processor 10 of the IoT device 1 generates an upload data message for the partner back-end system 4 and transmits it via the communication circuit 12 to the mobile communication device 2 within communication range of the IoT device 1. Depending on the scenario and/or application, the upload data message is encrypted by the processor 10, using the cryptographic key 112 stored in the IoT device 1, and may include a confirmation (acknowledgement) message, a status report message related to the status of the IoT device 1 (e.g. low battery), and/or a data payload with data values associated with the IoT device 1, such as sensor data, operational data of an appliance or machine connected to the IoT device 1, etc.

In step S52, the mobile communication device 2 or its processor 20, respectively, transmits the upload data message from the IoT device 1 via the communication network 5 to the remote computer system 3 for forwarding to the partner back-end system 4.

In step S53, the remote computer system 3 stores the address of the mobile communication device 2 which forwarded the upload data message as the current "communication relay address" 321.

In step S54, the remote computer system 3 transmits the upload data message to the partner back-end system 4.

In step S55, the partner back-end system 4 processes the upload data message from the IoT device 1. If encrypted, the upload data message is decrypted by the partner back-end system 4.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the disclosure.

We claim:

1. A method of communicating between an Internet of Things device and a remote computer system, the method comprising:
   receiving in the Internet of Things device a secured data package from a mobile communication device via a close range communication circuit;
   decrypting in the Internet of Things device the secured data package, using a cryptographic key stored securely in the Internet of Things device;
   extracting in the Internet of Things device from the secured data package an identifier of a back-end system associated with the remote computer system and storing the identifier of the back-end system in the Internet of Things device;
   transmitting via the close range communication circuit an upload data message for the remote computer system from the Internet of Things device to the mobile communication device, within the close range of the Internet of Things device, for forwarding to the remote computer system via a mobile radio communication network, the upload data message including a unique identifier of the Internet of Things device and the identifier of the back-end system stored in the Internet of Things device;
   receiving in the remote computer system the upload data message from the Internet of Things device, as forwarded by the mobile communication device via the mobile radio communication network;
   storing in the remote computer system an address of the mobile communication device, as a communication relay address, linked to the unique identifier of the Internet of Things device;
   transmitting via the mobile radio communication network a download data message for the Internet of Things device from the remote computer system to the communication relay address linked to the unique identifier of the Internet of Things device, for forwarding to the Internet of Things device; and
   receiving in the Internet of Things device the download data message from the remote computer system, as forwarded by the mobile communication device via the close range communication circuit.

2. The method of claim 1, further comprising:
   generating in the Internet of Things device a verification message by encrypting the unique identifier, stored securely in the Internet of Things device, using a cryptographic key stored securely in the Internet of Things device, and including the verification message in the upload data message; and
   verifying the unique identifier by the remote computer system decrypting the verification message included in the upload data message, using a cryptographic key stored securely in the remote computer system.

3. The method of claim 1, further comprising:
   extracting in the Internet of Things device a replacement cryptographic key from the secured data package decrypted; and
   replacing the cryptographic key stored securely in the Internet of Things device with the replacement cryptographic key.

4. The method of claim 1, further comprising:
   receiving in the remote computer system, with the upload data message from the Internet of Things device, customization information included by the mobile communication device;
   storing in the remote computer system the customization information linked to the unique identifier of the Internet of Things device;
   transmitting the customization information with the download data message from the remote computer system to the communication relay address linked to the unique identifier of the Internet of Things device, for forwarding to the Internet of Things device; and
   storing in the Internet of Things device the customization information received with the download data message from the remote computer system, as forwarded by the mobile communication device.

5. The method of claim 1, wherein the download data message includes executable code for the Internet of Things device, the method further comprising:
   encrypting the download data message, using an encryption key;
   decrypting, by the Internet of Things device, the download data message from the remote computer system, as forwarded by the mobile communication device, using a cryptographic key stored securely in the Internet of Things device;
   extracting the executable code from the download data message; and
   installing and executing the executable code in the Internet of Things device.

6. An Internet of Things device, comprising:
   an electronic communication circuit for close range communication;
   a processor connected to the electronic communication circuit; and
   a data store having stored therein securely a unique identifier of the Internet of Things device and an identifier of a back-end system associated with a remote computer system, wherein the processor is configured to:
      receive in the Internet of Things device a secured data package from a mobile communication device via the electronic communication circuit,
      decrypt in the Internet of Things device the secured data package, using a cryptographic key stored securely in the Internet of Things device,
      extract in the Internet of Things device from the secured data package an identifier of a back-end system associated with the remote computer system,
      store the identifier of the back-end system in the Internet of Things device, transmit via the electronic communication circuit to the mobile communication device, within the close range of the Internet of Things device, an upload data message for the remote computer system, for forwarding by the mobile communication device via a mobile radio communication network to the remote computer system, the upload data message including a unique identifier of the Internet of Things device and the identifier of the back-end system stored in the Internet of Things device, and receive via the close range communication circuit a download data message from the remote computer system, as received by the mobile communication device from the remote computer system via a mobile radio communication network and forwarded by the mobile communication device via the close range communication circuit to the Internet of Things device.

7. The Internet of Things device of claim 6, wherein the processor is further configured to generate in the Internet of Things device a verification message by encrypting the unique identifier, using a cryptographic key stored securely in the Internet of Things device, and including the verification message in the upload data message, for verification of the unique identifier by the remote computer system.

8. The Internet of Things device of claim 6, wherein the processor is further configured to:

extract in the Internet of Things device a replacement cryptographic key from the secured data package decrypted, and replace the cryptographic key stored securely in the Internet of Things device with the replacement cryptographic key.

9. The Internet of Things device of claim 6, wherein the processor is further configured to:

extract from the download data message customization information included by the remote computer system, and store in the Internet of Things device the customization information received with the download data message from the remote computer system, as forwarded by the mobile communication device.

10. The Internet of Things device of claim 6, wherein the processor is further configured to:

extract from the download data message a version indicator, included by the remote computer system, and discard in the Internet of Things device the download data message from the remote computer system, as forwarded by the mobile communication device, if the version indicator included in the download data message is outdated when compared to version indicators stored in the Internet of Things device, from previously received download data message from the remote computer system, as forwarded previously by the mobile communication device.

11. The Internet of Things device of claim 6, wherein the processor is further configured to:

decrypt the download data message from the remote computer system, as forwarded by the mobile communication device, using a cryptographic key stored securely in the Internet of Things device, extract from the download data message executable code, included by the remote computer system, and install and execute the executable code in the Internet of Things device.

12. The Internet of Things device of claim 6, wherein the processor is further configured to:

extract from the download data message, as forwarded by the mobile communication device, an instruction from a back-end system for the Internet of Things device, included by the remote computer system, and execute the instruction in the Internet of Things device, wherein the instruction comprises at least one of: a reset instruction, a firmware update instruction, or an access rights update instruction.

13. A method of communicating between an Internet of Things device and a remote computer system, the method comprising:

receiving in the Internet of Things device a secured data package from a mobile communication device via a close range communication circuit;

decrypting in the Internet of Things device the secured data package, using a cryptographic key stored securely in the Internet of Things device;

extracting in the Internet of Things device from the secured data package an identifier of a back-end system associated with the remote computer system and storing the identifier of the back-end system in the Internet of Things device;

transmitting via the close range communication circuit an upload data message for the remote computer system from the Internet of Things device to the mobile communication device, within the close range of the Internet of Things device, for forwarding to the remote computer system via a mobile radio communication network, the upload data message including a unique identifier of the Internet of Things device and the identifier of the back-end system stored in the Internet of Things device;

receiving in the remote computer system the upload data message from the Internet of Things device, as forwarded by the mobile communication device via the mobile radio communication network;

storing in the remote computer system an address of the mobile communication device, as a communication relay address, linked to the unique identifier of the Internet of Things device;

transmitting via the mobile radio communication network a download data message for the Internet of Things device from the remote computer system to the communication relay address linked to the unique identifier of the Internet of Things device, for forwarding to the Internet of Things device; and receiving in the Internet of Things device the download data message from the remote computer system, as forwarded by the mobile communication device via the close range communication circuit, wherein the download data message includes a version indicator, the method further comprising discarding in the Internet of Things device the download data message from the remote computer system, as forwarded by the mobile communication device, if the version indicator included in the download data message is outdated when compared to version indicators stored in the Internet of Things device, from previously received download data message from the remote computer system, as forwarded previously by the mobile communication device.

14. A method of communicating between an Internet of Things device and a remote computer system, the method comprising:

receiving in the Internet of Things device a secured data package from a mobile communication device via a close range communication circuit;

decrypting in the Internet of Things device the secured data package, using a cryptographic key stored securely in the Internet of Things device;

extracting in the Internet of Things device from the secured data package an identifier of a back-end system associated with the remote computer system and storing the identifier of the back-end system in the Internet of Things device;

transmitting via the close range communication circuit an upload data message for the remote computer system from the Internet of Things device to the mobile communication device, within the close range of the Internet of Things device, for forwarding to the remote computer system via a mobile radio communication network, the upload data message including a unique identifier of the Internet of Things device and the identifier of the back-end system stored in the Internet of Things device;

receiving in the remote computer system the upload data message from the Internet of Things device, as forwarded by the mobile communication device via the mobile radio communication network;

storing in the remote computer system an address of the mobile communication device, as a communication relay address, linked to the unique identifier of the Internet of Things device;

transmitting via the mobile radio communication network a download data message for the Internet of Things device from the remote computer system to the communication relay address linked to the unique identifier of the Internet of Things device, for forwarding to the Internet of Things device, wherein the download data message comprises an instruction from a back-end system for the Internet of Things device;

receiving in the Internet of Things device the download data message from the re-mote computer system, as forwarded by the mobile communication device via the close range communication circuit;

extracting, by the Internet of Things device, the instruction from the download data message, as forwarded by the mobile communication device; and executing the instruction in the Internet of Things device, wherein the instruction comprising at least one of: a reset instruction, a firmware update instruction, or an access rights update instruction including access rights and/or access right time data.

* * * * *